United States Patent
Kruse et al.

(10) Patent No.: US 10,110,629 B1
(45) Date of Patent: Oct. 23, 2018

(54) MANAGED HONEYPOT INTRUSION DETECTION SYSTEM

(71) Applicant: Amazon Technologies, Inc., Seattle, WA (US)

(72) Inventors: William Frederick Hingle Kruse, Seattle, WA (US); Hassan Sultan, Seattle, WA (US); Nicholas Howard Brown, Seattle, WA (US); James Leon Irving, Jr., Herndon, VA (US); Donald Lee Bailey, Jr., Penn Laird, VA (US)

(73) Assignee: Amazon Technologies, Inc., Seattle, WA (US)

( * ) Notice: Subject to any disclaimer, the term of this patent is extended or adjusted under 35 U.S.C. 154(b) by 201 days.

(21) Appl. No.: 15/080,504

(22) Filed: Mar. 24, 2016

(51) Int. Cl.
*H04L 29/06* (2006.01)

(52) U.S. Cl.
CPC ...... *H04L 63/1491* (2013.01); *H04L 63/1416* (2013.01)

(58) Field of Classification Search
None
See application file for complete search history.

(56) References Cited

U.S. PATENT DOCUMENTS

| | | | | |
|---|---|---|---|---|
| 7,383,578 B2 * | 6/2008 | Blake | .................. | H04L 63/1441 709/224 |
| 9,485,276 B2 * | 11/2016 | Quinlan | .............. | H04L 63/1491 |
| 9,838,427 B2 * | 12/2017 | Quinlan | .............. | H04L 63/1491 |
| 2014/0096229 A1 * | 4/2014 | Burns | ................. | H04L 63/1491 726/15 |
| 2017/0163682 A1 * | 6/2017 | Yu | ........................ | H04L 63/1491 |
| 2017/0244748 A1 * | 8/2017 | Krause | .................... | H04L 63/20 |

* cited by examiner

*Primary Examiner* — Christopher Revak
(74) *Attorney, Agent, or Firm* — Davis Wright Tremaine LLP

(57) ABSTRACT

A honeypot resource management service receives a request to provision one or more honeypot resources. In response to the request, the service identifies at least one computing resource service that is to be used to present the one or more honeypot resources. The service generates configuration information that is transmitted to the at least one computing resource service to cause the computing resource service to present the one or more honeypot resources to users in accordance with a set of parameters specified in the configuration information.

20 Claims, 9 Drawing Sheets

MANAGED HONEYPOT INTRUSION DETECTION SYSTEM

BACKGROUND

A honeypot, in the context of computer network security, can include software and hardware resources that are intended detect, deflect, or counteract attempts at unauthorized use of information systems. In some examples, honeypots can include simulated network resources such as simulated virtual machines, simulated storage, and the like, but in other examples, real network resources can be a part of a honeypot. Some honeypots are designed to trick malicious users into believing that they are using or have access to legitimate resources or important data, when in reality the resources are simulated or the data that the malicious user has access to is not real. Additionally, honeypots can act as a decoy for malicious users. For example, a honeypot can provide a seemingly easy or attractive intrusion point into a network that acts as a distraction from other network vulnerabilities and locations of sensitive information.

Accordingly, with malicious users believing that they have been undetected and have access to resources and information of interest, the actions of these malicious users can be tracked and neutralized. For example, by allowing malicious users to act within honeypots can allow network administrators to learn about potential security risks of a network and gain information about malicious users that can be provided to law enforcement or can otherwise be used to stop these malicious users. However, while honeypots can be valuable tools for learning about, containing, and deflecting malicious users, service providers that provide computing resources to various customers may potentially impact users utilizing these computing resources should these users select, with no malicious intent, these honeypots. Further, customers may want to determine how honeypots are presented to certain users, if at all.

BRIEF DESCRIPTION OF THE DRAWINGS

Various techniques will be described with reference to the drawings, in which.

DETAILED DESCRIPTION

Figure 1:
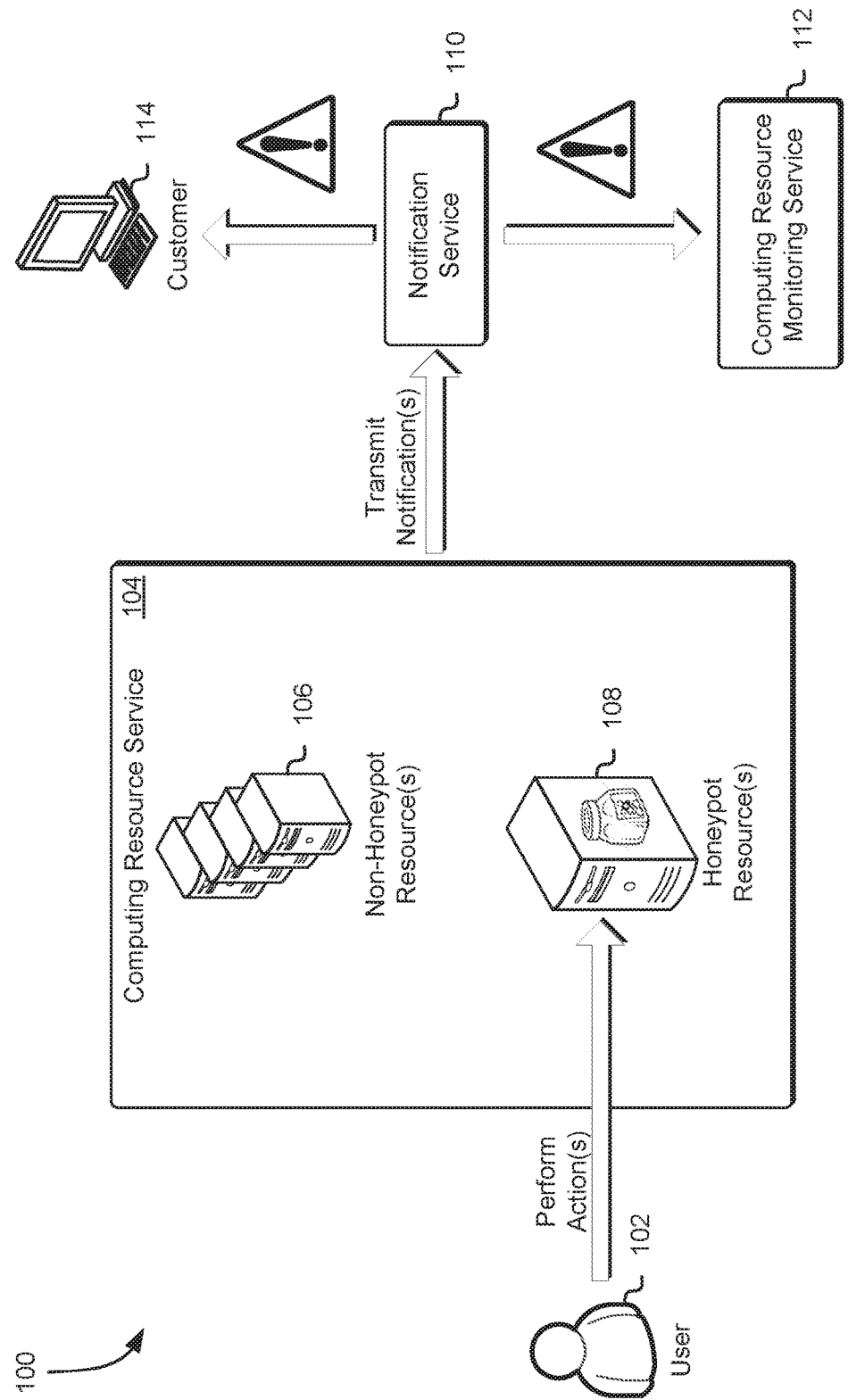
FIG. 1 shows an illustrative example of an environment in which a notification is provided to customers and a computing resource monitoring service in response to detection of actions being performed on a honeypot resource in accordance with at least one embodiment.

This disclosure relates to the configuration, provisioning, and monitoring of honeypot resources to detect malicious or otherwise unauthorized access to computing resources. In one example, a customer of a computing resource service provider submits a request to a honeypot resource management service to provision a honeypot resource. A customer may specify what honeypot resources are to be provisioned alongside its existing computing resources across various services provided by the computing resource service provider. For instance, a customer may request creation of a honeypot resource that is presented to users in the form of a database through a database service. The honeypot resource management service may authenticate the customer making the request and determine whether the customer is authorized to have honeypot resources provisioned for its account in order to determine whether the request to provision the honeypot resources is to be fulfilled. If the customer is authenticated by the honeypot resource management service and is authorized to provision a honeypot resource, the honeypot resource management service may evaluate the request to determine whether specific users have been specified that are to be presented with the honeypot resources in response to these specific users accessing the customer's account. In some examples, a customer can specify which users are considered trusted users and thus should not be presented with honeypot resources. Based on the configuration of the honeypot resource specified by the customer, the honeypot resource management service may configure the target computing resource services to present and monitor the honeypot resource to users accessing these services through the customer's account.

In some examples, a computing resource service receives a request from a user to access the service to perform actions on any number of computing resources. In response to the request, the computing resource service may obtain one or more policies that are applicable to the request and determine whether the user is a trusted user, as specified by the customer or determined by the honeypot resource management service through evaluation of past user actions. If the computing resource service, through a policy evaluation component, determines that the user is a trusted user, the computing resource service may present only non-honeypot resources to the user. In some examples, the computing resource service can also present honeypot resources to the user except that interactions with these honeypot resources may not be monitored for the user. However, if the user is not a trusted user, the computing resource service may determine the configuration for honeypot resources to be presented to the user and proceed to present the user with honeypot resources along with the non-honeypot resources associated with the customer's account. The configuration of the honeypot resources may be provided by the honeypot resource management service, through the policies applicable to the request, or through customer determination. In response to presentation of the honeypot resources to the user, the computing resource service, through the policy evaluation component, may monitor user interactions with the honeypot resources.

If the policy evaluation component detects that a user has accessed a honeypot resource, the policy evaluation component may determine whether the user is a trusted user or not. If the user is a trusted user, the policy evaluation component may determine, based on policies applicable to the trusted user or configuration information from the honeypot resource management service, whether a notification indicating access to the honeypot resource by the trusted user is required. If it is required or untrusted user access to the honeypot resource is detected, the policy evaluation component may identify various user characteristics (e.g., user name, Internet Protocol (IP) address, web browser information, etc.) and generate a notification indicating honeypot resource access by the user and the identified user characteristics. The policy evaluation component may transmit this notification to a notification service for distribution to entities subscribed to a topic associated with notifications for honeypot resource access associated with the customer's account. For instance, the notification may be provided to the customer, who may determine what actions are to be taken with regard to the user accessing the honeypot resource through the customer's account. Additionally, or alternatively, the notification may be provided to a computing resource monitoring service, which may evaluate the user actions with regard to the honeypot resource to determine whether remedial actions, such as termination or suspension of user access, are required to address the user's attempt to access unauthorized resources.

In this manner, a customer, through a honeypot resource management service, can provision a variety of honeypot resources across any number of computing resource services to learn about potential security risks to its account and gain information about malicious users attempting to access sensitive computing resources. In addition, the techniques described and suggested in this disclosure enable additional technical advantages. For instance, because a customer can configure the honeypot resources to only be accessible by untrusted users, any trusted users may not be trapped by any honeypot resources as they would be unable to access or even see these honeypot resources when accessing a computing resource service through the customer's account. Further, since the honeypot resource management service may enable the customer to evaluate user interactions with the honeypot resources, the customer may determine if any users may be considered trusted users and, thus, change the configuration of the honeypot resources such that these honeypot resources may no longer be accessible to users newly deemed to be trusted. This enables the customer to customize honeypot resources for various computing resource services at any time through the honeypot resource management service.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which a notification is provided to customers 114 and a computing resource monitoring service 112 in response to detection of actions being performed on a honeypot resource 108 in accordance with at least one embodiment. In the environment 100, a computing resource service 104 is configured to provide non-honeypot resources 106 and honeypot resources 108 to a user 102 of the computing resource service 104. For instance, in response to a user request to access the computing resource service 104, may obtain a set of policies from a policy management service that may be used to determine whether the user 102 is authorized to access the one or more computing resources. A user 102 may include human operators of computing devices, automated processes, bots, automated agents, semi-automated agents, and the like. It should be noted that the term "user" includes computer systems operated in response to input from human operators, computer systems operating according to automated and/or semi-automated processes, and other such actors and entities. The computing resource service 104 may check whether the fulfillment of the request for access to the service 104 would comply with the obtained policies using a policy evaluation component. A computing resource policy is a collection of permissions associated with a user, a group, a role, an organization, a company, or some other such entity. Each permission may be associated with a computing resource and may specify whether the entity (also referred to herein as a "principal") may access that resource, under what conditions access may be allowed or denied, and/or what type of access may be allowed or denied. For example, a permission may specify that a user named "USER1" may access a certain data storage device denoted by identifier "12345." A more detailed permission may specify that USER1 may only read from resource 12345, but may not write to resource 12345. A still more detailed permission may specify that USER1 may read from resource 12345 at any time, but may only write to resource 12345 between the hours of 9:00 and 9:30 AM. Permissions may also be associated with classes or collections of resources so that, for example, USER1 may have access to a collection of data storage devices, one of which may be resource 12345. Principals may include individual users, accounts, computing resource services, or other principal entities that are allowed or denied access to a computing resource.

In an embodiment, the obtained policies can specify whether the user 102 is to be presented with one or more honeypot resources 108 by the computing resource service 104. For instance, a customer of a computing resource service provider may provide a policy that may be applied to particular users in response to incoming requests from these particular users. The customer, through the set of policies, may specify whether particular users are to be presented with honeypot resources 108 through the computing resource service 104. Alternatively, the customer may specify through the set of policies that particular users need not be presented with the honeypot resources 108, as these particular users may be considered to be trusted users. In some embodiments, the customer transmits a request to a honeypot resource management service to provision one or more honeypot resources 108 that may be presented to users of the computing resource service 104 that have been granted permission to access the customer's resources. Through the request, the customer may specify specific users (e.g., user names, IP addresses of the users, etc.) that are to be presented with the honeypot resources 108 as a result of these specific users accessing specified computing resource services 104.

In some embodiments, through the honeypot resource management service, the customer can specify one or more trusted users that are not to be presented with honeypot resources 108 in the event that any of the one or more trusted users access the target computing resource services 104. For instance, if the user 102 is deemed a trusted user, the computing resource service 104 may only present the non-honeypot resources 106 to the user 104. In an alternative embodiment, the customer can specify in its request to the honeypot resource management service that trusted users may be presented with the honeypot resources 108 but that any interaction with these honeypot resources 108 should not be tracked or result in a notification from the computing resource service 104 to the customer. The customer, through the honeypot resource management service may further determine the characteristics of the honeypot resources 108 to be presented to users of the computing resource service. For instance, a customer may specify the name for each honeypot resource 108 to be presented to users. The customer may select a name for each honeypot resource 108 that would be enticing to a malicious or otherwise unauthorized user to access. Alternatively, the customer may specify through its request to the honeypot resource management service that the honeypot resource management service may utilize one or more default settings for configuring the honeypot resources 108. This may cause the honeypot resource management service to determine how the honeypot resources 108 are to be presented to users, the name of each of these honeypot resources, and configuration information specifying any triggers for notifying the customer in the event that a user accesses a honeypot resource 108.

In response to a request from a user to access the target computing resource service 104, the computing resource service 104 may obtain the applicable policies for the user 102 and determine, based at least in part on the obtained applicable policies and the configuration information from the honeypot resource management service, whether to present the user 102 with honeypot resources 108 in addition to any non-honeypot resources 106 made available by the computing resource service 104. If the user 102 is to be presented with any honeypot resources 108, the computing resource service 104 may generate the one or more honeypot resources 108 and present these one or more honeypot resources 108 to the user 102. Alternatively, if the computing resource service 104 determines, based at least in part on the obtained policies and configuration information, that the user 102 is not to be presented with any honeypot resources 108, the computing resource service 104 may forego configuration and presentation of the one or more honeypot resources 108.

Each non-honeypot resource 106 and honeypot resource 108 may include metadata that can be analyzed by a policy evaluation component of the computing resource service 104 to determine user interaction with these resources. For instance, if the user 102 selects or otherwise performs one or more operations using a honeypot resource 108, the policy evaluation component of the computing resource service 104 may obtain metadata associated with the honeypot resource 108. The metadata may specify the name of the target honeypot resource 108, the requested action performed using the honeypot resource 108, and other information that may be used to determine user interactions with the honeypot resource 108. The policy evaluation component of the computing resource service 104 may obtain this metadata for the honeypot resource 108 and determine whether a notification is to be generated based at least in part on this interaction with the honeypot resource 108. For instance, if the user 102, based at least in part on the one or more policies applicable to the user, is to be considered a trusted user, the computing resource service 104 may not generate a notification indicating user interaction with one or more honeypot resources 108.

If the user 102 performing one or more actions on the honeypot resources 108 is not a trusted user or the one or more policies specify that any interactions with honeypot resources 108 are to be tracked and catalogued, the computing resource service 104 may generate a notification indicating the detected interaction with a honeypot resource 108 presented to the user 102. Additionally, the policy evaluation component of the computing resource service 104 may obtain additional user information that may be included in the notification. For instance, the policy evaluation component may obtain, for the user 102: a user identifier, IP addresses for the user 102, a unique browser identifier for the user 102, and the like. The computing resource service 104, through the policy evaluation component, may utilize this information to generate the notification indicating interaction with one or more honeypot resources 108. The policy evaluation component may transmit this notification to one or more notification services 110 for dissemination to other entities.

The one or more notification services 110 may enable the computing resource service 104 to send notifications to large numbers of recipients or other distributed networks and receive notifications through a communications network. A customer 114 may utilize an interface, provided by the computing resource service provider, to create or subscribe to one or more topics to which one or more messages may be published through. For instance, a customer 114 may use the interface to create a new topic and subscribe to this topic by specifying that any messages published to the topic may be transmitted to a particular location (e.g., electronic mail address, one or more servers, an existing queue within the managed queuing service, etc.). Accordingly, in response to the computing resource service 104 publishing a message to the topic, the message may be transmitted to each recipient subscribed to the topic. The computing resource service 104 may add the notification generated in response to detection of user interaction with a honeypot resource 108 to this topic, which may cause the one or more notification services 110 to transmit the notification to the customer 114 and other recipients which may be subscribed to this particular topic. While topics and subscriptions to topics are used extensively throughout the present disclosure for the purpose of illustration, a customer 114 or other services may submit a request to the one or more notification services 110 to receive notifications associated with the computing resource service 104 in response to detection of access to the one or more honeypot resources 108.

In some embodiments, a computing resource monitoring service 112 of a computing resource service provider is subscribed to the one or more topics to which the one or more messages may be published through. In response to a notification being published by the computing resource service 104 in response to detection of interaction with the one or more honeypot resources 108, the computing resource monitoring service 112 may obtain the notification and perform one or more remedial actions to address any issues associated with user interaction with the one or more honeypot resources 108. For instance, based at least in part on the received notification, the computing resource monitoring service 112 may block the user 102 from accessing the computing resource service 104 or otherwise restrict access to particular computing resources provided by the computing resource service 104. The computing resource monitoring service 112 may additionally, or alternatively, notify an intrusion detection service to indicate a possible intrusion of the computing resource service 104. This may cause the intrusion detection service to investigate the intrusion further and determine any potential remedial actions that may be performed to prevent further intrusions from the user 102 or other unauthorized users.

Figure 2:
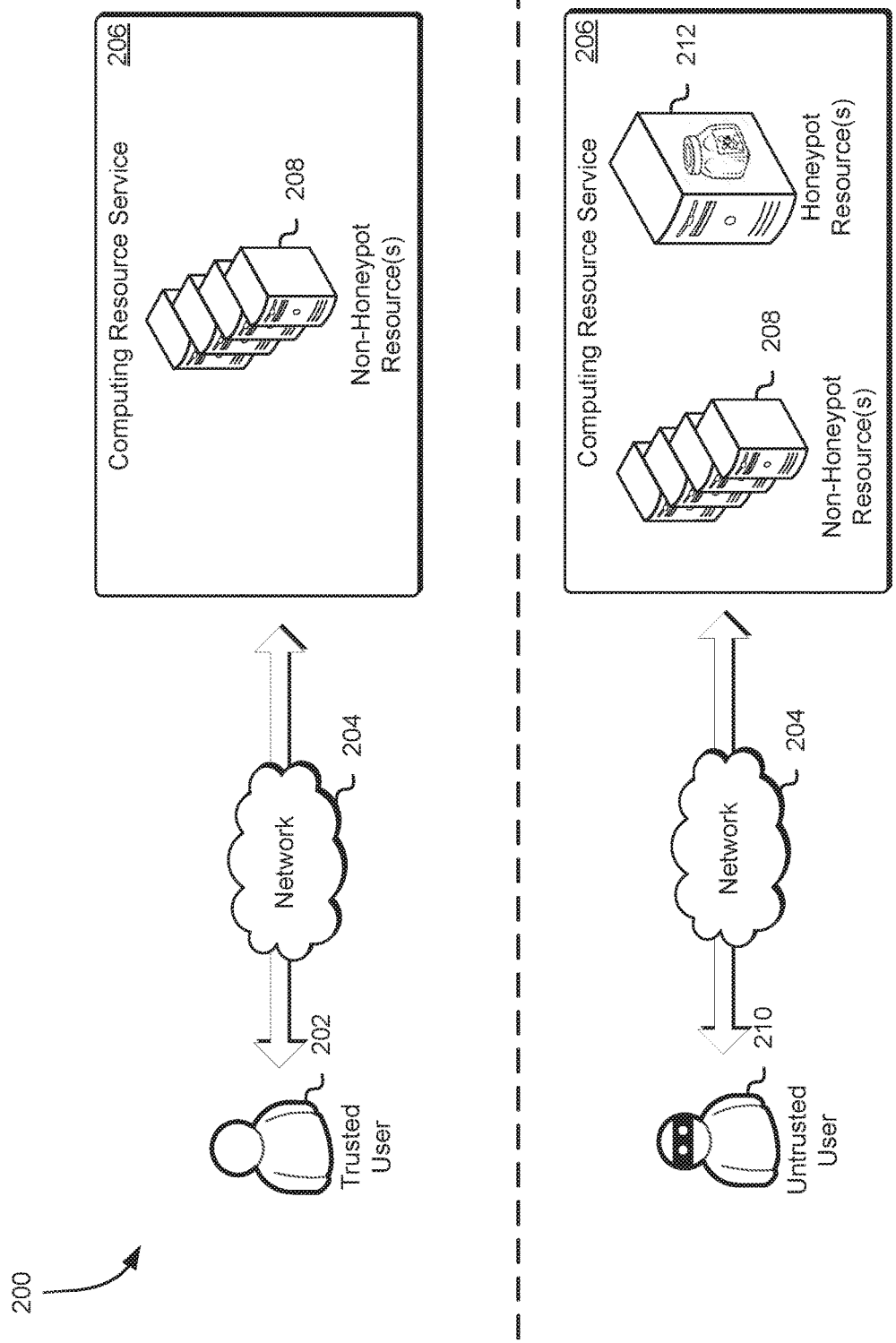
FIG. 2 shows an illustrative example of an environment in which honeypot resources are made available only to untrusted users in response to accessing a computing resource service in accordance with at least one embodiment.

As noted above, a customer of a computing resource service provider can specify that honeypot resources are to be presented to untrusted users should any untrusted user access a computing resource service to interact with one or more computing resources associated with the customer's account. Accordingly, FIG. 2 shows an illustrative example of an environment 200 in which honeypot resources 212 are made available only to untrusted users 210 in response to accessing a computing resource service in accordance with at least one embodiment. In the environment 200, a user may use a computing device to communicate over a network 204 with a computing resource service provider. Communications between the computing resource service provider and the user may, for instance, be for the purpose of accessing a service 206 operated by the computing resource service provider, which may be one of many services operated by the computing resource service provider. In an embodiment, in response to a user request to access the computing resource service 206, the computing resource service 206 obtains one or more policies that may be applicable to the request to determine whether the request is to be fulfilled or denied.

The one or more policies may further specify whether the user submitting the request to access the computing resource service 206 is to be presented with one or more honeypot resources 212 in addition to any non-honeypot resources 210 that may be readily available to the user through the service 206. For instance, a customer, through a honeypot resource management service, may specify that certain users, such as untrusted users 210, are to be presented with honeypot resources 212 to determine whether these untrusted users 210 are attempting to access sensitive information or other information the customer does not want these users 210 to access. Alternatively, the customer may specify one or more trusted users 202 that need not be presented with honeypot resources 212 should any of these one or more trusted users 202 submit a request to access the computing resource service 206. In response to the customer's request to provision one or more honeypot resources that are to be presented to untrusted users 210 requesting access to the computing resource service 206, the honeypot resource management service may generate one or more computing resource policies that may be applicable to incoming requests to access the computing resource service 206. These one or more computing resource policies may specify whether honeypot resources 212 are to be presented to the user making the request to access the computing resource service 206.

In response to an incoming request to access the computing resource service 206, the computing resource service 206 may evaluate the obtained one or more policies to determine whether the user is authorized to access the computing resource service 206 and, if so, whether the user is to be presented with one or more honeypot resources 212. For instance, if the computing resource service 206 determines, based at least in part on the obtained policies and information obtained from the user, that the user is to be considered a trusted user 202, the computing resource service 206 may present the trusted user 202 with only non-honeypot resources 208 as no additional monitoring of the trusted user 202 is required. In some embodiments, the computing resource service 206 presents honeypot resources 212 in addition to non-honeypot resources 208 to any trusted user 202. However, based at least in part on the obtained policies applicable to the request, the computing resource service 206 may not monitor any interactions between the trusted user 202 and the honeypot resources 212 to prevent any adverse or remedial actions from being taken against the trusted user 202.

If, based at least in part on the obtained policies, the computing resource service 206 determines that the user is an untrusted user 210, the computing resource service 206 may present this untrusted user 210 with one or more honeypot resources 212. The one or more honeypot resources 212 may be ephemeral, whereby the one or more honeypot resources 212 may be temporarily available through the computing resource service 206 and may not be tied to sensitive or otherwise critical hardware or software components of the computing resource service 206. The one or more honeypot resources 212 may be monitored by the computing resource service 206 through a policy evaluation component of the service 206. This policy evaluation component may be configured to detect any interaction with the one or more honeypot resources 212 and determine whether to transmit a notification to one or more notification services to inform the customer or other services of the interaction with the honeypot resources 212. For instance, in response to user interaction with a non-honeypot resource 208 or a honeypot resource 212, the policy evaluation component may obtain metadata associated with the target computing resource and determine whether the target computing resource is a honeypot resource 212. If the policy evaluation component determines that an untrusted user 210 has interacted with a honeypot resource 212, the policy evaluation component may generate a notification that specifies an identifier for the honeypot resource 212, as well as an indication of the interaction between the user and the honeypot resource 212 and user information that may be used to identify the particular user attempting to access the honeypot resource 212.

The computing resource service 206 may transmit the notification indicating an interaction between the untrusted user 210 and a honeypot resource 212 to one of more notification services. As noted above, the one or more notification services may enable the computing resource service 206 to send notifications to large numbers of recipients or other distributed networks and receive notifications through a communications network. The computing resource service 206 may publish the notification through a particular topic created using the one or more notification services. In response to the computing resource service 206 publishing the notification to the topic, the notification may be transmitted to each recipient subscribed to the topic. The computing resource service 206 may add the notification generated in response to detection of user interaction with a honeypot resource 212 to this topic, which may cause the one or more notification services to transmit the notification to the customer, a computing resource monitoring service, and other recipients which may be subscribed to this particular topic.

Figure 3:
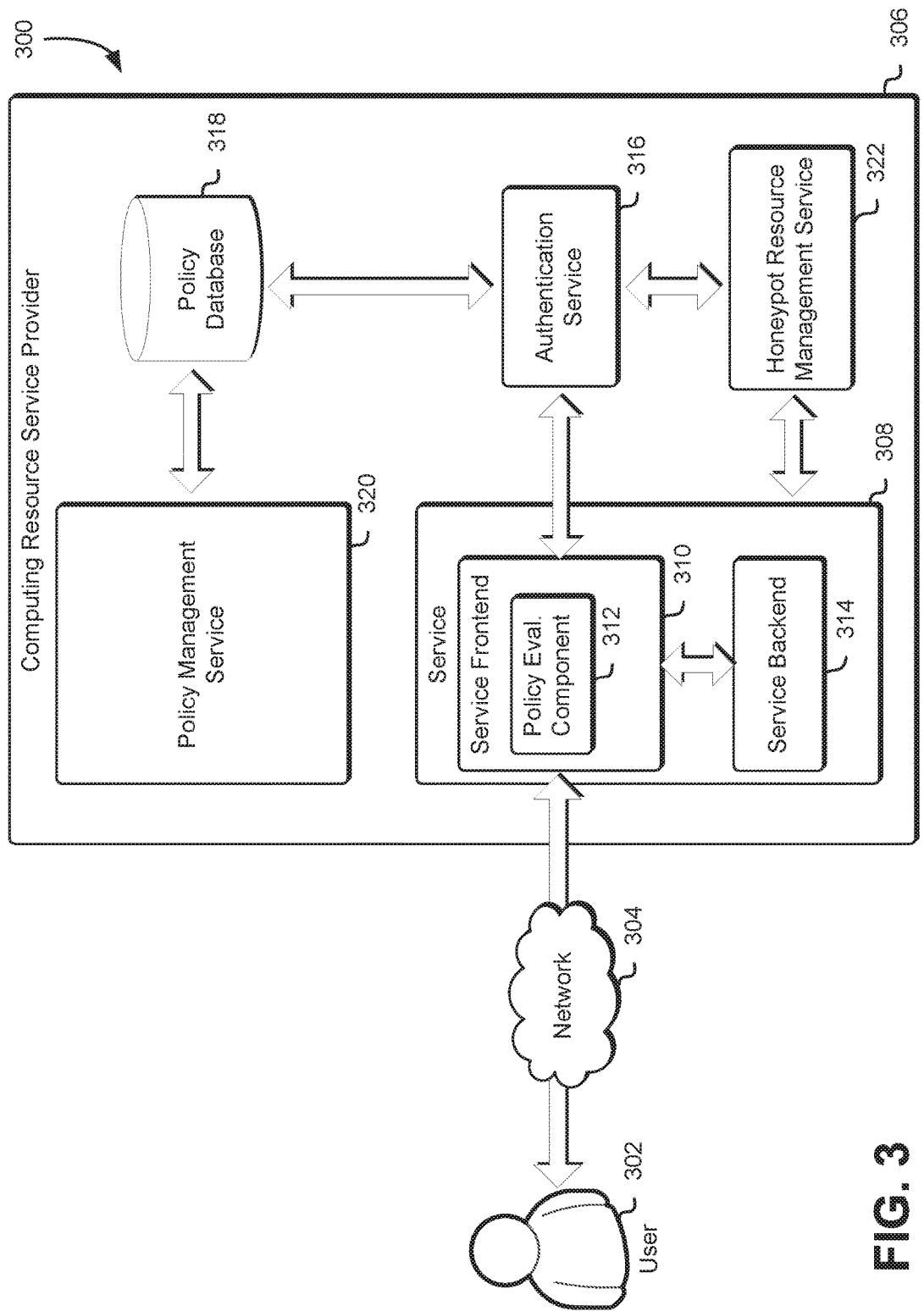
FIG. 3 shows an illustrative example of an environment in which honeypot resources are provisioned and presented to certain users based at least in part on one or more policies applicable to the user in accordance with at least one embodiment.

FIG. 3 shows an illustrative example of an environment 300 in which honeypot resources are provisioned and presented to certain users based at least in part on one or more policies applicable to the user in accordance with at least one embodiment. In an embodiment, a user 302 may use a computing device to communicate over a network 304 with a computing resource service provider 306. Communications between the computing resource service provider 306 and the user 302 may, for instance, be for the purpose of accessing a service 308 operated by the computing resource service provider 306, which may be one of many services operated by the computing resource service provider 306. The service 308 may comprise a service frontend 310 and a service backend 314. The user 302 may issue a request for access to a service 308 (and/or a request for access to resources associated with the service 308) provided by a computing resource service provider 306. The request may be, for instance, a web service application programming interface request. The user may be an individual, or a group of individuals, or a role associated with a group of individuals, or a process representing one or more of these entities that may be running on one or more remote (relative to the computing resource service provider 306) computer systems, or may be some other such computer system entity, individual, or process. Each individual, group, role, or other such collection of users may have a corresponding user definition, group definition, role definition, or other definition that defines the attributes and/or membership of that collection. For example, a group may be a group of users that have the same geographical location. The definition of that group of users may include the membership of the group, the location, and other data and/or metadata associated with that group. As used herein, a user is an entity corresponding to an identity managed by the computing resource service provider, where the computing resource service provider manages permissions for the identity and where the entity may include one or more sub-entities, which themselves may have identities.

The user 302 may communicate with the computing resource service provider 306 via one or more connections (e.g., transmission control protocol (TCP) connections). The user 302 may use a computer system client device to connect to the computing resource service provider 306. The client device may include any device that is capable of connecting with a computer system via a network, such as example devices discussed below. The network 304 may include, for example, the Internet or another network or combination of networks discussed below.

The computing resource service provider 306, through the service 308, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments.

The request for access to the service 308 may be received by a service frontend 310, which, in some examples, comprises a web server configured to receive such requests and to process them according to one or more policies associated with the service 308. The request for access to the service 308 may be a digitally signed request and, as a result, may be provided with a digital signature. The service frontend 310 may then send the request and the digital signature for verification to an authentication service 316. The authentication service 316 may be a stand-alone service or may be part of a service provider or other entity. The authentication service 316, in an embodiment, is a computer system configured to perform operations involved in authentication of users. In some examples, requests submitted to the service frontend 310 are digitally signed by the user 302 (i.e., by a computing device used by or operating on behalf of the principal) using a symmetric cryptographic key that is shared between the user 302 and the authentication service 316. The authentication service, therefore, may use a copy of the symmetric cryptographic key to verify digital signatures of requests purported to have been generated by the user 302. However, in other embodiments, the authentication service 316 can be configured to utilize asymmetric cryptography for digital signature verification such as, for example, in response to the principal digitally signing requests using a private cryptographic key. In such embodiments, the authentication service may be configured to trust a certificate authority that digitally signed a certificate of the user 302 corresponding to the private cryptographic key. Consequently, in some embodiments, the authentication service may use a public cryptographic key specified by the certificate.

If the request is successfully authenticated, the authentication service 316 may then obtain policies applicable to the request. A policy may be applicable to the request by way of being associated with the user 302, a resource to be accessed as part of fulfillment of the request, a group in which the user 302 is a member, a role the user 302 has assumed, and/or otherwise. To obtain policies applicable to the request, the authentication service 416 may transmit a query to a policy database 318 managed by a policy management service 320. The policy management service 320 may also determine the policy version associated with the policy by transmitting a query to the policy database 318.

In an embodiment, a customer of the computing resource service provider 306 may transmit a request to a honeypot resource management service 322 to provision and implement one or more honeypot resources for presentation to users 302 of the service 308. In response to the customer request to provision these honeypot resources, the honeypot resource management service 322 may transmit the request for verification to the authentication service 316. If the request is successfully authenticated, the authentication service 316 may then obtain policies applicable to the customer request, which the honeypot resource management service 322 may use to determine whether the customer is authorized to provision honeypot resources for users accessing computing resources through the customer's account. If the honeypot resource management service 322 determines that the customer is authorized to provision one or more honeypot resources, the honeypot resource management service 322 may determine, based at least in part on the customer request, configuration information for the honeypot resources that are to be provisioned and presented to users of the service 308. For instance, a customer may specify that certain trusted users are not to be presented with the one or more honeypot resources to be provisioned. Alternatively, a customer, through the request, may specify that the service 308 is not to monitor access to the honeypot resources by the trusted users identified in the request. The customer may further specify the properties for the one or more honeypot resources that are to be provisioned (e.g., resource names, resource types, information included within the resources, etc.). In some embodiments, the customer can request that the honeypot resource management service 322 itself determine the properties for the honeypot resources to be presented to users of the service 308.

In response to the customer request to provision one or more honeypot resources that are to be presented along with its non-honeypot resources through the service 308, the honeypot resource management service 322 may generate one or more policies that may be used by the service 308 to determine whether to present honeypot resources to the user 302 accessing the service 308. For instance, these one or more policies may be stored within the policy database 318 any may be obtained by the authentication service 316 in response to a query to a policy database 318 to obtain policies applicable to the user request. In some embodiments, the honeypot resource management service 322 can also store configuration information for the policy evaluation component 312 of the service frontend 310 such that the policy evaluation component 312 may evaluate the incoming requests using the one or more policies obtained from the policy database 318 and present honeypot resources as needed.

The query to the policy database 318 may be a request comprising information sufficient to determine a set of policies applicable to the request and the associated version for each policy of this set of policies. The query to the policy database 318 may, for instance, contain a copy of the request and/or contain parameters based at least in part on information in the request, such as information identifying the user, the resource, and/or an action (operation to be performed as part of fulfillment of the request). The policy database 318 may be a database or other system operable to process queries. The policy database 318 may process queries by providing records and/or other such data applicable to the request and/or responsive to the queries. Note that, if authentication of the request is unsuccessful (e.g., because a digital signature could not be verified), policies applicable to the request and/or usage data associated with the policy may not be provided to the requester.

Having obtained any policies applicable to the request, the authentication service 316 may provide an authentication response and, if applicable, the obtained policies back to the service frontend 310. The authentication response may indicate whether the response was successfully authenticated. The service frontend 310 may then check whether the fulfillment of the request for access to the service 308 would comply with the obtained policies using a policy evaluation component 312, as described above. A policy evaluation component 312 may be a process executing on the service frontend that is operable to compare the request to the one or more permissions in the policy to determine whether service may satisfy the request (i.e., whether fulfillment of the request is authorized). For example, the policy evaluation component may compare an API call associated with the request against permitted API calls specified by the policy to determine if the request is allowed. If the policy evaluation component 312 is not able to match the request to a permission specified by the policy, the policy evaluation component 312 may execute one or more default actions such as, for example, providing a message to the service frontend that causes the service frontend to deny the request, and causing the denied request to be logged in the policy management service 320. If the authorization matches the request to one or more permissions specified by the policy, the policy evaluation component 312 may resolve this by selecting the least restrictive response (as defined by the policy) and by informing the service frontend whether the fulfillment of the request is authorized (i.e., complies with applicable policy) based on that selected response. The policy evaluation component 312 may also select the most restrictive response or may select some other such response and inform the service frontend whether the fulfillment of the request is authorized based on that selected response. Note that, while FIG. 3 shows the policy evaluation component 312 as a component of the service frontend 310, in some embodiments, the policy evaluation component 312 is a separate service provided by the computing resource service provider 306 and the frontend service may communicate with the authorization module 312 over a network.

If the fulfillment of the request for access to the service 308 complies with the applicable obtained policies, the service frontend 310 may fulfill the request using the service backend 314. A service backend 314 may be a component of the service configured to receive authorized requests from the service frontend 410 and configured to fulfill such requests. The service frontend 310 may, for instance, submit a request to the service backend to cause the service backend 314 to perform one or more operations involved in fulfilling the request. In some examples, the service backend 314 provides data back to the service frontend 310 that the service frontend provides in response to the request from the user 302. In some embodiments, a response to the user 302 may be provided from the service frontend 310 indicating whether the request was allowed or denied and, if allowed, one or more results of the request.

In an embodiment, if the policy evaluation component 312 determines, based at least in part on the obtained policies, that the user 302 is not a trusted user, the policy evaluation component 312 transmits a message to the service frontend 310 to present the user 302 with one or more honeypot resources as determined by the customer or the honeypot resource management service 322. For instance, the policy evaluation component 312 may utilize configuration information obtained from the honeypot resource management service 322 to determine the configuration and presentation of the honeypot resources through the service 308. In response to the message, the service frontend 310 may submit a request to the service backend 314 to cause the service backend 314 to present the honeypot resources to the user 302 according to the configuration information provided by the honeypot resource management service 322 and through the obtained policies applicable to the user. Additionally, the service frontend 310 may transmit a request to the service backend 314 to monitor interactions between the user 302 and the honeypot resources. This may cause the service backend 314 to monitor access to the honeypot resources and transmit notifications, including resource metadata, to the policy evaluation component 312 should the user 302 interact with the honeypot resources.

If the policy evaluation component 312 receives a notification from the service backend 314 indicating user interaction with one or more honeypot resources, the policy evaluation component 312 may generate a notification indicating user interaction with the one or more honeypot resources and other user information that may be unique to the user 302 and used to identify the user. The policy evaluation component 312 may transmit this notification to one or more notification services where the notification may be disseminated to the customer, the policy management service 320, a computing resource monitoring service, an intrusion detection service, and any other entities that may be subscribed to the particular topic associated with the honeypot resources provisioned by the customer. This may enable the customer or another entity to perform one or more remedial actions to prevent further user access to sensitive information and resources provided by the service 308.

It should be noted that in some alternative embodiments, the honeypot resource management service 322 can generate one or more policies that may be used to prevent presentation of honeypot resources to trusted users as specified by the customer. For instance, if a trusted user submits one or more requests to access the service 308, the policy evaluation component 312 may evaluate one or more policies for the trusted user and determine that the trusted user is not to be presented with one or more honeypot resources. In another embodiment, the honeypot resource management service 322 can generate one or more policies that may be used to prevent tracking of any interactions between a trusted user and any of the honeypot resources that may be presented to the trusted user by the service 308. Thus, if a trusted user interacts with a honeypot resource, the service backend 314 may not track the trusted user's interactions and may not transmit a notification to the policy evaluation component 312 specifying such interaction.

Figure 4:
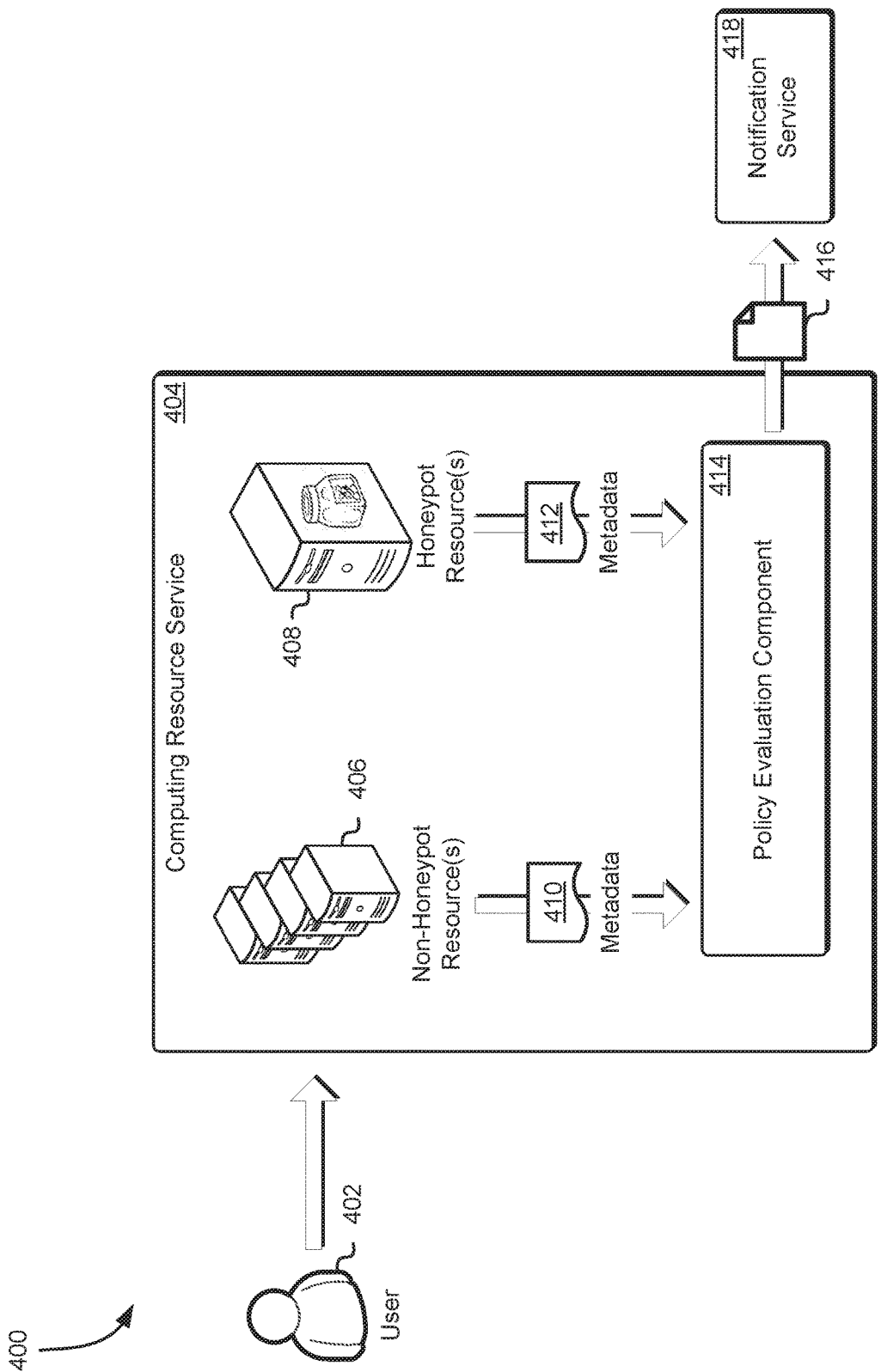
FIG. 4 shows an illustrative example of an environment in which a policy evaluation component of a computing resource service transmits a notification to a notification service in response to detection of user actions being performed on a honeypot resource in accordance with at least one embodiment.

As noted above, a policy evaluation component of a computing resource service may obtain notifications from a service backend in response to user interactions with non-honeypot and honeypot resources presented to the user. If the policy evaluation component receives a notification indicating that an untrusted user has accessed a honeypot resource, the policy evaluation component may publish a notification to a notification service for dissemination to various entities that may perform remedial actions to address the user's attempt to access sensitive resources. Accordingly, FIG. 4 shows an illustrative example of an environment 400 in which a policy evaluation component 414 of a computing resource service 404 transmits a notification 416 to a notification service 418 in response to detection of user actions being performed on a honeypot resource 408 in accordance with at least one embodiment.

In the environment 400, a user 402 submits a request to the computing resource service 404 to interact with one or more computing resources. In response to the request, the computing resource service 404 may transmit the request to an authentication service for verification. If the request is successfully authenticated, the authentication service may provide the policy evaluation component 414 of the computing resource service 404 with one or more policies that may be used to determine whether fulfillment of the request for access to the service 404 complies with the applicable obtained policies. If so, the policy evaluation component 414 may enable the user 402 to interact with the one or more computing resources provided by the computing resource service 404 in accordance with the obtained policies.

In an embodiment, the policy evaluation component 414 obtains one or more policies indicating that the user 402 is to be presented with one or more honeypot resources 408 in addition to any non-honeypot resources 406 that may usually be presented to the user 402 based at least in part on the obtained policies. The policy evaluation component 414 may transmit a notification along with configuration information to the service frontend of the computing resource service 404 that may cause the computing resource service 404 to present the user 402 with the one or more honeypot resources 408. In some embodiments, if the policy evaluation component 414 determines, based at least in part on the obtained policies, that the user 402 is a trusted user as defined by a customer of the honeypot resource management service or by the honeypot resource management service itself, the policy evaluation component 414 will cause the computing resource service 404 to only present the non-honeypot resources 406 to the user 402. Thus, the user 402, if determined to be a trusted user, may not be able to interact with any honeypot resources 408.

As the user 402 interacts with the one or more computing resources presented to the user 402 by the computing resource service 404, the policy evaluation component 414 may obtain metadata associated with each of these computing resources. For instance, if the user 402 interacts with a non-honeypot resource 406, the policy evaluation component 414 may obtain non-honeypot resource metadata 410 indicating the actions performed by the user 402 on the non-honeypot resource 406, as well as an indication that the non-honeypot resource 406 is not a honeypot resource and thus no remedial actions need to be taken to address the user's access to this particular computing resource. The policy evaluation component 414 may compile this metadata into one or more data logs that may be used by the customer or a computing resource monitoring service to track usage of these non-honeypot resources 406.

If the user 402 interacts with a honeypot resource 408, the policy evaluation component 414 may obtain honeypot resource metadata 412 associated with the honeypot resource 408. The honeypot resource metadata 412 may specify that the computing resource the user 402 has interacted with is a honeypot resource 408 and may also specify the one or more actions performed by the user 402 in its interactions with the honeypot resource 408. If the policy evaluation component 414, through evaluation of the received metadata, determines that the user 402 has interacted with a honeypot resource 408, the policy evaluation component 414 may gather additional information about the user 402 that may be used to uniquely identify the user 402 or the entity assuming the identity of the user 402 to access the honeypot resources 408. For instance, the policy evaluation component 414 may obtain a user identifier, the IP address of the computing device utilized to access the computing resource service 404, a unique browser identifier for the computing device, and the like. This information may be used to generate a unique profile for the entity attempting to access the honeypot resources 408.

The policy evaluation component 414 may utilize the information obtained from the honeypot resource metadata 412 and the user 402 (or entity assuming the identity of the user 402) to generate a notification 416. The policy evaluation component 414 may transmit the notification 416 to one or more notification services 418 for distribution to one or more recipients. As noted above, the one or more notification services 418 may enable the computing resource service 404 to send notifications to large numbers of recipients or other distributed networks and receive notifications through a communications network. A customer may utilize an interface, provided by the computing resource service provider, to create or subscribe to one or more topics to which one or more messages may be published through. Accordingly, in response to the policy evaluation component 414 publishing a message to the topic, the message may be transmitted to each recipient subscribed to the topic. The policy evaluation component 414 may add the notification generated in response to detection of user interaction with a honeypot resource 408 to this topic, which may cause the one or more notification services 418 to transmit the notification 416 to the customer and other recipients which may be subscribed to this particular topic.

Figure 5:
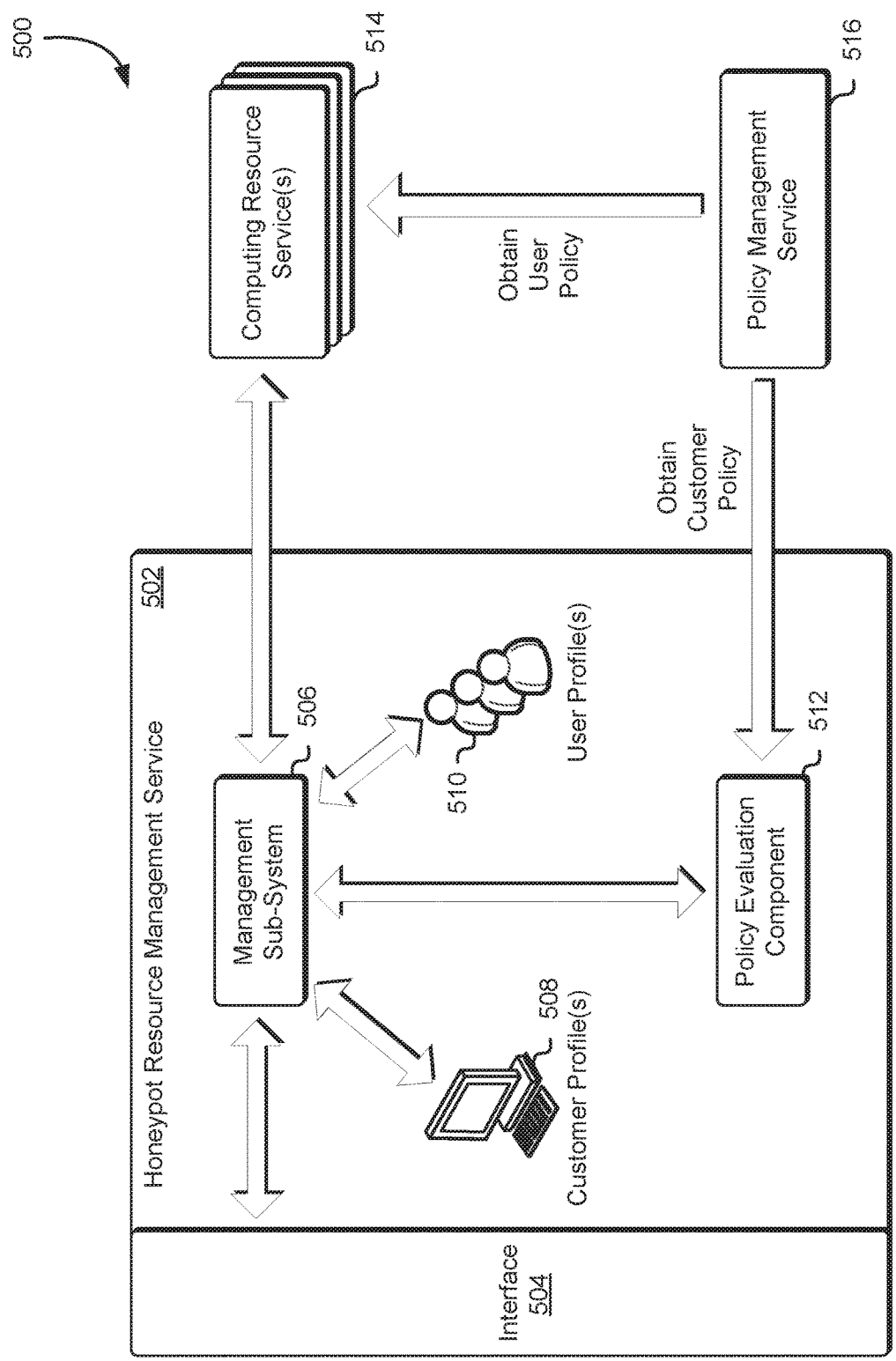
FIG. 5 shows an illustrative example of an environment in which one or more honeypot resources can be configured through use of a honeypot resource management service in accordance with at least one embodiment.

FIG. 5 shows an illustrative example of an environment 500 in which one or more honeypot resources can be configured through use of a honeypot resource management service 502 in accordance with at least one embodiment. In the environment 500, the honeypot resource management service 502 includes one or more components that may be utilized to process and fulfill requests from customers of the computing resource service provider to provision honeypot resources that may be presented to various users along with the customer's computing resources to identify any potentially malicious or otherwise unauthorized users. For instance, the honeypot resource management service 502 may include an interface 504, which may comprise one or more computer systems or applications configured to obtain requests from customers of the computing resource service provider and provide information to the customer in response to these requests. The interface 504 may include a graphical user interface (GUI) which a customer may use to specify the parameters of the honeypot resources to be presented to various users and the target computing resource services for which the honeypot resources are to be presented alongside other non-honeypot resources provisioned by the customer. For instance, the interface 504 may include a computing resource services field, which the customer may use to specify the computing resource services 514 that are to present honeypot resources to users accessing computing resources through these services 514. Additionally, the interface 504 may include one or more user fields that the customer may use to select one or more trusted users for whom the honeypot resources are not to be presented. Alternatively, a customer may specify, through the interface 504, that access to the honeypot resources by these trusted users may not be tracked.

In an embodiment, in response to a customer request to provision one or more honeypot resources for its account, the interface 504 transmits a request to a management sub-system 506 of the honeypot resource management service 502. The management sub-system 506 may comprise one or more computer systems, processes, or applications configured to process incoming customer requests to provision one or more honeypot resources and to transmit configuration information to one or more computing resource services 514 to enable presentation of the honeypot resources to untrusted users. For instance, in response to an incoming customer request to provision honeypot resources, the management sub-system 506 may provide the request to a policy evaluation component 512. The policy evaluation component 512 may interact with an authentication service to determine whether the incoming customer request can be successfully authenticated. If so, the policy evaluation component 512 may further obtain a set of customer policies from a policy management service 516 or from a policy database. The policy evaluation component 512 may utilize the obtained policies to determine whether the customer request to provision honeypot resources can be fulfilled.

If the policy evaluation component 512 determines, based at least in part on the obtained customer policies that the customer can provision the requested honeypot resources, the management sub-system 506 may access a customer profile datastore 508 to obtain the customer's profile and determine which computing resource services 514 are being utilized by the customer for its active computing resources. Based at least in part on this determination, the management sub-system 506 may update the interface 504 to present the customer with an ordering of the computing resource services 514 for which honeypot resources may be provisioned. In addition to obtaining the customer's profile from the customer profile datastore 508, the management sub-system 506 may access a user profile datastore 510 to identify one or more users that may have access to customer resources made available through the one or more computing resource services 514. The management sub-system 506 may also present an ordering of these identified users to the customer through the interface 504. The customer may utilize this ordering to exclude certain trusted users from being presented with the provisioned honeypot resources.

In response to the honeypot resource configuration provided by the customer through the interface 504, the management sub-system 506 may generate one or more computing resource policies that may be used by the computing resource services 514 to determine whether a user is to be presented with one or more honeypot resources. The management sub-system 506 may transmit these policies to a policy database of the policy management service 516 in order to make the policies available to the computing resource services 514. In addition to transmitting the one or more computing resource policies to the policy management service 516, the management sub-system 506 may transmit configuration information to the one or more computing resource services 514. The configuration information may specify how the honeypot resources are to be presented to untrusted users accessing the one or more computing resource services 514, as well as instructions for tracking user actions using the honeypot resources.

If a computing resource service 514 receives a request to access the computing resource service 514, the computing resource service 514 may transmit the request to an authentication service. If the authentication service is able to successfully authenticate the request, the computing resource service 514 may obtain, from the policy management service 516, a set of policies applicable to the request. These set of policies may include the one or more policies generated by the honeypot resource management service 502 for presentation of honeypot resources. Based at least in part on the obtained policies, the computing resource policy 514 may determine whether to present the user with one or more honeypot resources. For instance, if the user is a trusted user, the computing resource service 514, based at least in part on the obtained policies, may prevent presentation of the one or more honeypot resources. Alternatively, if the trusted user is presented with honeypot resources, the computing resource service 514 may not track any user interaction with these honeypot resources. However, if the computing resource service 514 determines, based at least in part on the obtained set of policies, that the user is an untrusted user, the computing resource service 514 may present the honeypot resources to the user and monitor any interactions between the user and the honeypot resources.

Figure 6:
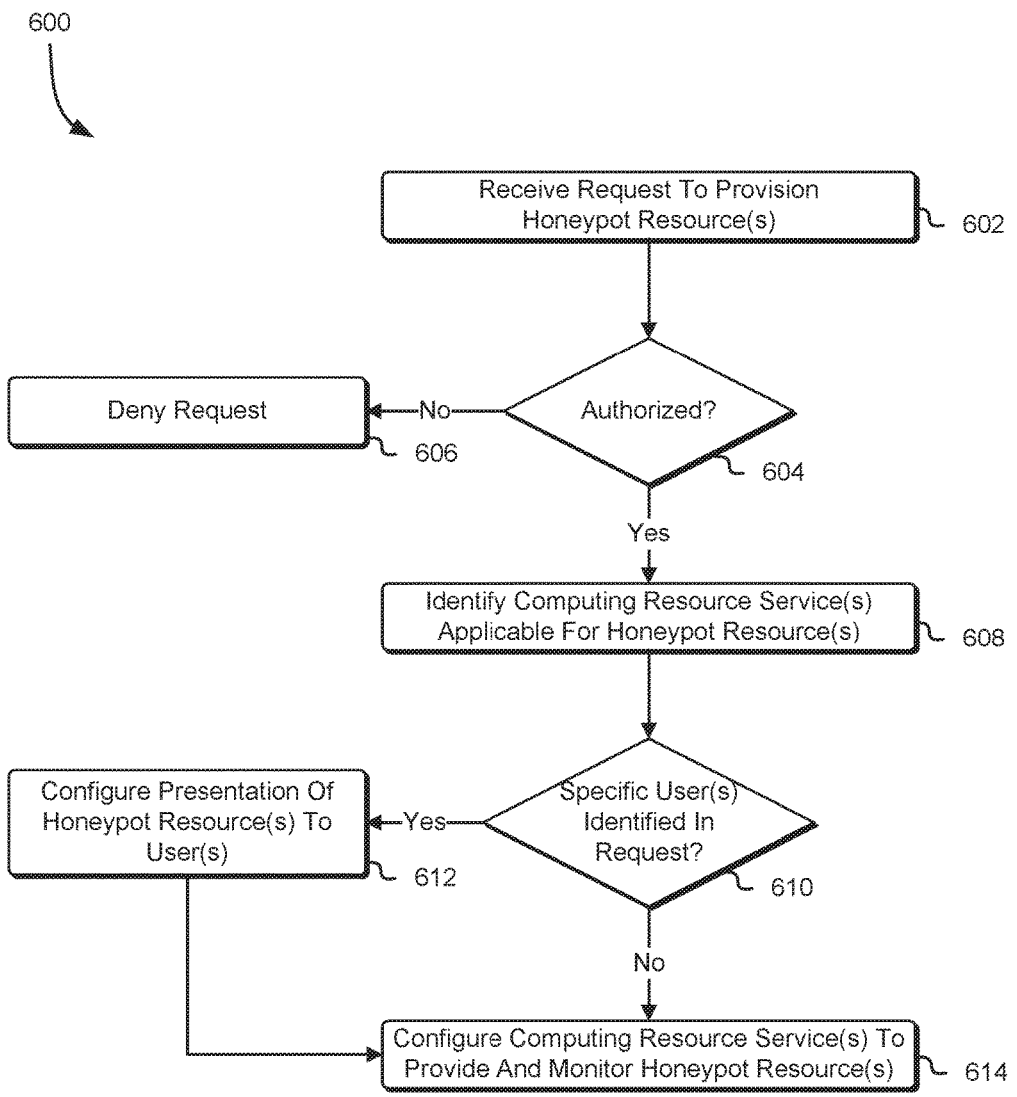
FIG. 6 shows an illustrative example of a process for configuring honeypot resources for one or more computing resource services in accordance with at least one embodiment.

As noted above, the honeypot resource management service may receive requests from customers of the computing resource service provider to provision one or more honeypot resources that may be presented to certain users in order to determine whether these users are attempting to access sensitive information. Accordingly, FIG. 6 shows an illustrative example of a process 600 for configuring honeypot resources for one or more computing resource services in accordance with at least one embodiment. The process 600 may be performed by the aforementioned honeypot resource management service, which is configured to process incoming customer requests to provision honeypot resources and to transmit configuration information to target computing resource services to configure and monitor the honeypot resources presented to various users of these services.

At any time, the honeypot resource management service may receive 602 a request from a customer of the computing resource service provider to provision one or more honeypot resources. The request may specify one or more computing resource services that may include customer resources and that have been selected to present one or more honeypot resources. Additionally, the customer, through the request, may specify one or more users that are to be considered trusted users. The customer may specify that these trusted users are not to be presented with any honeypot resources if they access the one or more computing resource services. Alternatively, the customer may specify that any interaction with honeypot resources performed by these trusted users are not to be monitored. In some embodiments, the customer can specify specific users that are considered untrusted and are to be monitored to determine if these users are interacting with the honeypot resources presented to these users through the one or more computing resource services. The customer may specify in the request the configuration of the one or more honeypot resources or may enable the honeypot resource management service to configure the honeypot resources itself.

In response to the customer request to provision one or more honeypot resources, the honeypot resource management service may determine 604 whether the customer is authorized to have one or more honeypot resources provisioned on its behalf. For instance, the honeypot resource management service may obtain one or more computing resource policies from a policy database. The honeypot resource management service may utilize these one or more computing resource policies to determine whether the customer request to provision the one or more honeypot resources may be fulfilled. If, based at least in part on these one or more computing resource policies, the honeypot resource management service determines that the request cannot be fulfilled because the customer is not authorized to provision the requested honeypot resources, the honeypot resource management service may deny 606 the request. In some embodiments, the honeypot resource management service transmits the request the request to an authentication service to authenticate the request, as described extensively above. If the request cannot be authenticated, the honeypot resource management service may deny 606 the request.

If the customer is authorized to provision the requested honeypot resources, the honeypot resource management service may identify 608 the one or more computing resource services applicable for the requested honeypot resources. The honeypot resource management service may evaluate the received request to determine the one or more computing resource services selected by the customer for presentation of the requested honeypot resources. Alternatively, if the customer has not specified any computing resource services, the honeypot resource management service may evaluate a customer profile to determine which computing resource services include computing resources associated with the customer. The honeypot resource management service may utilize these identified computing resource services for provisioning of the honeypot resources.

The honeypot resource management service may further determine 610, based at least in part on the provided request, whether the customer has identified specific users that are to be presented with the one or more honeypot resources. If the customer has identified, through the request, specific users that are to be presented with the requested honeypot resources, the honeypot resource management service may configure 612 presentation of the honeypot resources for these particular users. For instance, the honeypot resource management service may generate one or more policies that, when applied to these specific users, may cause the one or more services to present the honeypot resources to only these users. Alternatively, if the customer has specified that the specific users are to be considered trusted users, the honeypot resource management service may configure presentation of these honeypot resources such that the honeypot resources are not presented to these users. If the customer has specified through the request that the honeypot resources should be presented to all users, but that access should not be tracked for specific users, the honeypot resource management service may prevent the one or more services from tracking user access to the honeypot resources for these identified users.

If the customer has not identified specific users in the request or the honeypot resource management service has successfully configured presentation of the honeypot resources for the users specified in the request, the honeypot resource management service may configure 614 target computing resource services to provide and monitor the honeypot resources according to the request. The honeypot resource management service may generate one or more computing resource policies that, when processed by a policy evaluation component of a target computing resource service, may cause the computing resource service to present the one or more honeypot resources according to configuration information provided by the honeypot resource management service. Further, the policy evaluation component may monitor any interactions between users and the honeypot resources to determine whether to generate notifications specifying such interactions. The honeypot resource management service, as noted above, may transmit configuration information to each of the selected computing resource services to enable these services to present honeypot resources to untrusted users and monitor interactions with these services.

Figure 7:
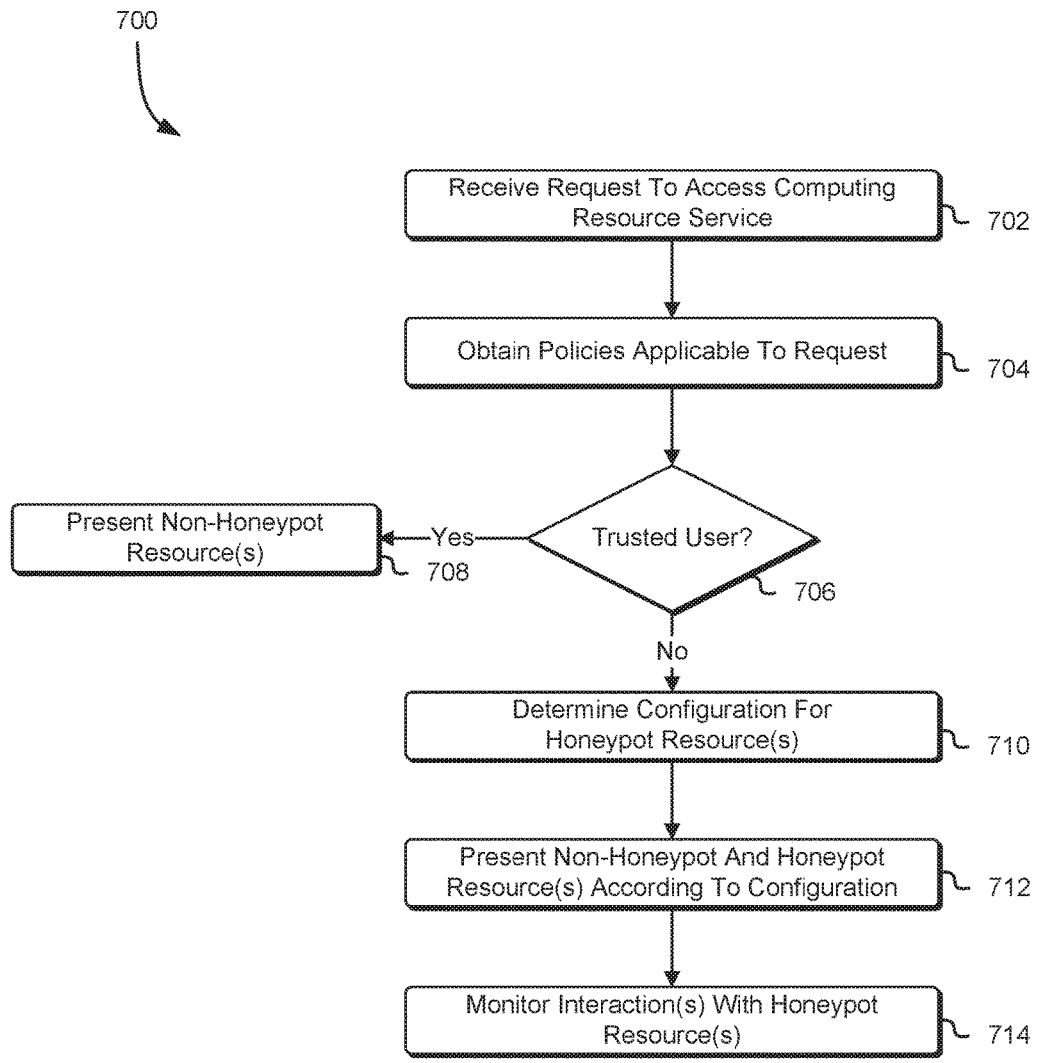
FIG. 7 shows an illustrative example of a process for presenting and monitoring honeypot resources for untrusted users in response to requests to access a computing resource service in accordance with at least one embodiment.

As noted above, a computing resource service may receive a request from a user to access the service and one or more computing resources. In response to the request, the computing resource service may determine whether the user is to be presented with one or more honeypot resources and whether to monitor user interactions with these one or more honeypot resources. Accordingly, FIG. 7 shows an illustrative example of a process 700 for presenting and monitoring honeypot resources for untrusted users in response to requests to access a computing resource service in accordance with at least one embodiment. The process 700 may be performed by any computing resource service configured to present honeypot resources to users of the service based at least in part on configuration information obtained from the honeypot resource management service and computing resource policies applicable to incoming user requests to access the service.

At any time, the computing resource service may receive 702 a request from a user to access the service to interact with one or more computing resources. The computing resource service may transmit the request to an authentication service to determine whether the request can be authenticated. If the request is successfully authenticated, the authentication service may obtain one or more policies applicable to the request from a policy database of the policy management service and may provide these obtained policies to the computing resource service. Thus, the computing resource service may obtain 704 the one or more computing resource policies that are applicable to the received user request.

Based at least in part on the obtained one or more policies, the computing resource service may determine 706 whether the user that submitted the request is a trusted user. As noted above, a customer may specify in its request to provision the one or more honeypot resources that specific users may be considered trusted users. The customer may specify that these trusted users are not to be presented with the provisioned one or more honeypot resources. In response to the customer request, the honeypot resource management service may generate the one or more applicable policies, which may specify that specific users are to be deemed trusted users and are not to be presented within the honeypot resources. Thus, if the computing resource service determines, based at least in part on the obtained policies applicable to the request, that user is a trusted user, the computing resource service may present 708 only non-honeypot resources to the user. It should be noted that in some embodiments, trusted users can be presented with honeypot resources in addition to non-honeypot resources. However, the computing resource service may forego monitoring of a trusted user's interactions with the honeypot resources in order to prevent any negative impact to the trusted user's experience.

If the user submitting the request to the computing resource service is not a trusted user, the computing resource service may evaluate the one or more policies and configuration information obtained from the honeypot resource management service to determine 710 the configuration of the honeypot resources to be presented to the user. For instance, the configuration information may specify the type of computing resource that the honeypot resource is to mimic or otherwise share one or more attributes with existing non-honeypot resources (e.g., text document, spreadsheet document, etc.) as well as any names for the honeypot resources that may be enticing to malicious users (e.g., "credentials.txt," "credit_card_numbers.xls," etc.). The configuration information may further include one or more parameters that may specify how the honeypot resources are to be presented to the user and the duration of such presentation. For instance, if the user does not select the honeypot resource after an initial session, the computing resource service may forego presentation of the honeypot resources during subsequent user sessions. Based at least in part on the configuration information for the honeypot resources, the computing resource service may present 712 the non-honeypot resources and the honeypot resources to the user in accordance to the set of parameters specified in the configuration information in response to the user request.

As the user interacts with the non-honeypot resources and the honeypot resources, the computing resource service may monitor 714 any interactions with the honeypot resources. For instance, the computing resource service, through a policy evaluation component, may evaluate metadata obtained based at least in part on interactions between the user and the computing resources presented to the user to determine whether the user has interacted with the honeypot resources. The metadata may specify whether the computing resource is a honeypot resource or a non-honeypot resource and may further specify the requested user action. As will be described in greater detail below, if the user interacts with a honeypot resource, the computing resource service may generate a notification indicating user interaction with the honeypot resource. This notification may be transmitted to various recipients, which may in turn be used to perform one or more remedial actions to address user interactions with these honeypot resources.

Figure 8:
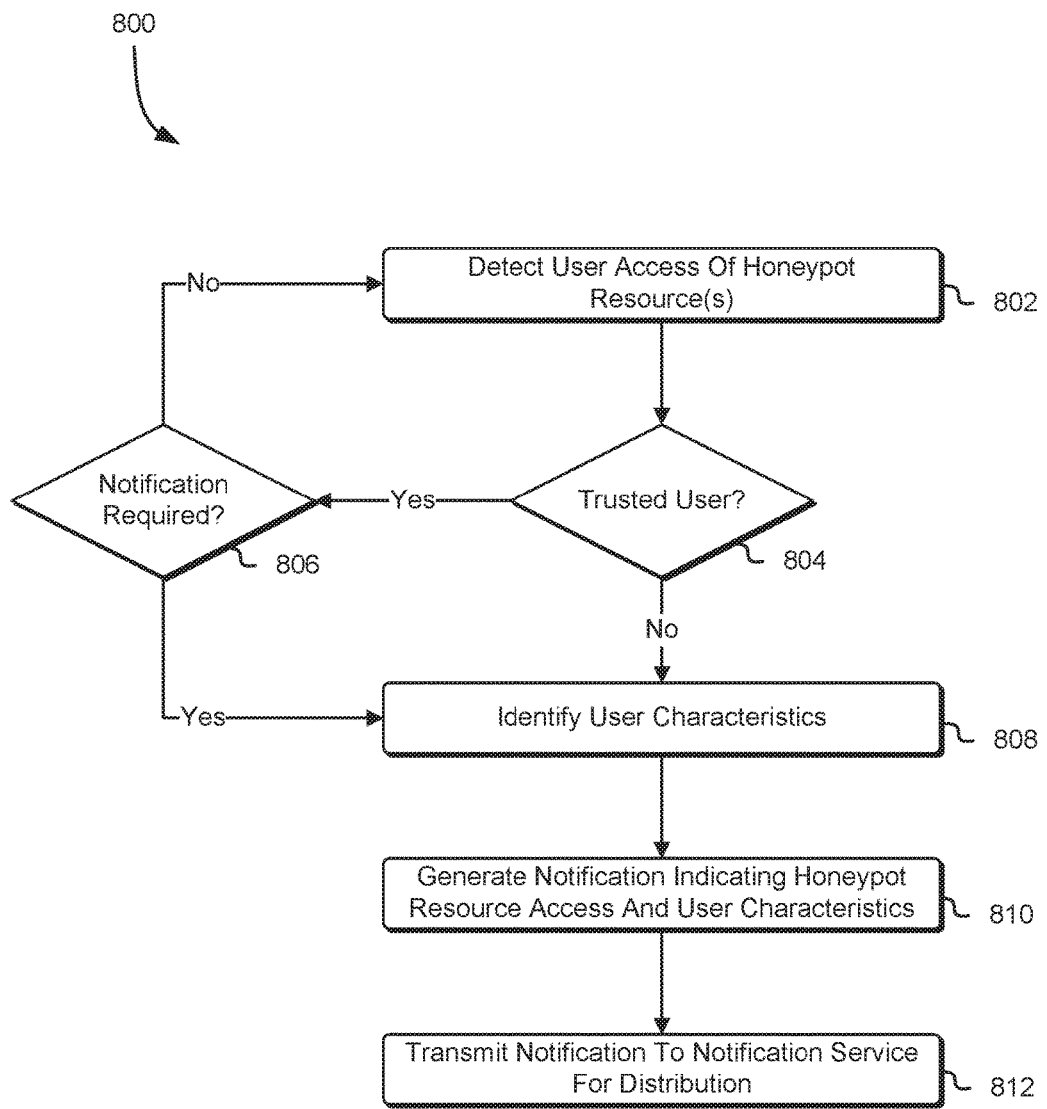
FIG. 8 shows an illustrative example of a process for transmitting notifications indicating detection of honeypot resource access in accordance with at least one embodiment.

FIG. 8 shows an illustrative example of a process 800 for transmitting notifications indicating detection of honeypot resource access in accordance with at least one embodiment. The process 800 may be performed by any computing resource service configured to present honeypot resources to untrusted users as determined through evaluation of the obtained computing resource policies and as defined by the customer who provisioned the honeypot resources. Certain steps of the process 800 may be performed by a policy evaluation component of the computing resource service, which may detect and evaluate user interactions with honeypot resources and generate notifications indicating such interactions for distribution to one or more notification services.

As a user interacts with computing resources provided by the computing resource service, the policy evaluation component may evaluate metadata associated with these computing resources. The metadata may specify an identifier for the computing resource being accessed as well as the actions performed by the user in interacting with the computing resource. Additionally, the metadata may specify whether the computing resource being accessed by the user is a honeypot resource as provided by the computing resource service. For instance, the metadata for a honeypot resource may include a tag that may indicate that the computing resource is a honeypot resource. The policy evaluation component may evaluate incoming metadata to detect 802 user access with any of the provided honeypot resources.

If the policy evaluation component detects user interaction with a honeypot resource, the policy evaluation component may evaluate any policies associated with the user to determine 804 whether the user is considered a trusted user by the customer or the honeypot resource management service. As noted above, the customer, while requesting provisioning of one or more honeypot resources for its account, can specify certain users that may be considered to be trusted users. For these trusted users, the customer may specify that the computing resource services are not required to monitor user interactions with the provisioned honeypot resources, as this may interfere with the trusted users' ability to interact with other computing resources. For instance, the customer may request that computing resource service omit at least one activity of the one or more trusted users from access logs generated by the policy evaluation component if the trusted user accesses any of the honeypot resources. Alternatively, the customer may specify that these computing resource services may monitor access to the honeypot resources for any users, as it may be desirable to determine whether certain trusted users can be trusted further or if these trusted user accounts have been compromised. Accordingly, if the user is deemed a trusted user, the policy evaluation component may determine 806 whether notification is required for the trusted user's interaction with a honeypot resource.

If the policy evaluation component determines, based at least in part on the obtained policies for the user request to access the honeypot resources, that a notification is not required, the policy evaluation component may continue to detect 802 user access of honeypot resources from any other users without generating a notification for the detected interactions with the honeypot resources. However, if the policy evaluation component determines that a notification is required for the trusted user, or the user interacting with the honeypot resource is not a trusted user, the policy evaluation component may identify 808 any user characteristics that may be used to uniquely identify the user. For instance, the policy evaluation component may obtain a user identifier for the user (e.g., user name, etc.), a user IP address, a user unique browser identifier, and the like.

The policy evaluation component may utilize the identified user characteristics, as well as the obtained metadata for the honeypot resources, to generate 810 a notification indicating user access to the honeypot resource. The policy evaluation component may transmit 812 this notification to one or more notification services for dissemination to one or more entities subscribed to a particular topic related to honeypot resource incursions within the honeypot resource service. For instance, the customer that requested provisioning of the honeypot resources may subscribe to this particular topic to obtain notifications indicating user access to these provisioned honeypot resources. A computing resource monitoring service or other security service may also be subscribed to the topic to obtain any notifications indicating user access to a honeypot resource. These services may utilize the notification to determine one or more remedial actions that may be performed to address user access to the honeypot resources. This may include termination or suspension of the user account, throttling of the user's access to computing resources, and the like.

Figure 9:
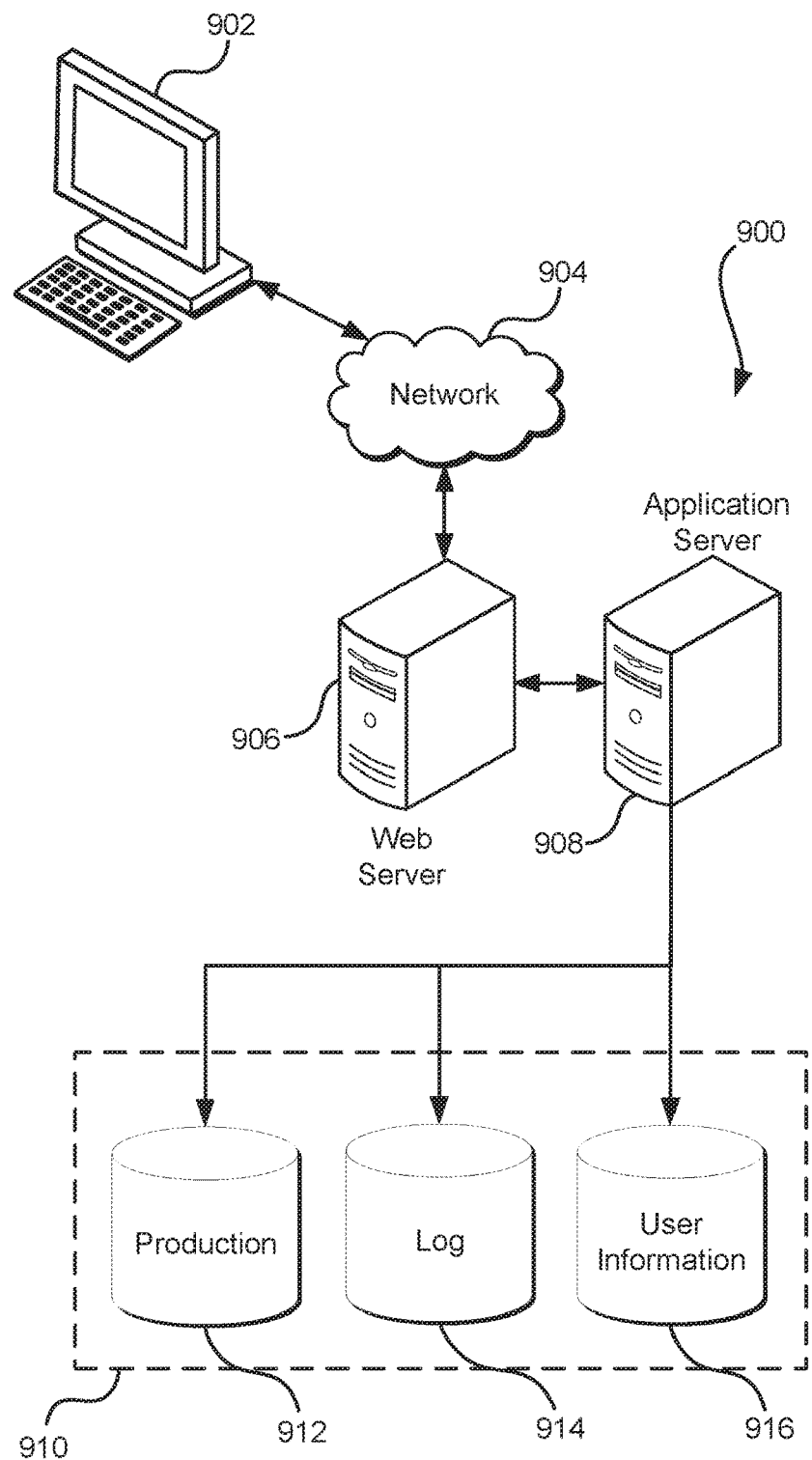
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving a request to provision one or more honeypot resources, the request specifying one or more computing resource services that are to be used to present the one or more honeypot resources in conjunction with existing non-honeypot resources;
generating one or more computing resource policies applicable to a first user of the one or more computing resource services that cause the one or more computing resource services to monitor access by the first user to the one or more honeypot resources;
transmitting the one or more computing resource policies to a policy database to make the one or more computing resource policies available to the one or more computing resource services; and
providing configuration information to the one or more computing resource services to cause, in response to requests to access the one or more computing resource services, the one or more computing resource services to:
present the one or more honeypot resources to the first user to enable monitoring of the access by the first user to the one or more honeypot resources; and
present the existing non-honeypot resources to a second user as a result of the one or more computing resource policies being inapplicable to the second user.

2. The computer-implemented method of claim 1, wherein the configuration information further causes the one or more computing resource services to transmit notifications to entities that have requested to receive notifications associated with the one or more computing resource services in response to detection of access to the one or more honeypot resources.

3. The computer-implemented method of claim 1, wherein:
the request further specifies one or more trusted users that are not to be presented with the one or more honeypot resources; and
the method further comprises generating additional policies applicable to the one or more trusted users that cause the one or more computing resource services to not present the one or more honeypot resources to the one or more trusted users.

4. The computer-implemented method of claim 1, wherein:
the request further specifies one or more trusted users; and
the method further comprises generating a set of additional policies applicable to the one or more trusted users that cause the one or more computing resource services to omit at least one activity of the one or more trusted users from access logs.

5. A system, comprising:
one or more processors; and
memory including instructions that, when executed by the one or more processors, cause the system to:
receive a request to provision one or more honeypot resources;
identify one or more computing resource services that are to be used to present the one or more honeypot resources; and
provide configuration information to the one or more computing resource services to cause the one or more computing resource services to:
present the one or more honeypot resources to a first user of the one or more computing resource services in accordance with a set of parameters specified in the configuration information; and
present non-honeypot resources to a second user as a result of the set of parameters being inapplicable to the second user.

6. The system of claim 5, wherein the instructions further cause the system to generate one or more computing resource policies applicable to the the first user, the one or more computing resource policies usable to cause the one or more computing resource services to monitor the access by the first user to the one or more honeypot resources.

7. The system of claim 5, wherein:
the request specifies a set of entities that are to be considered trusted entities; and
the instructions further cause the system to generate one or more policies that, as a result of being applied by the one or more computing resource services, cause the one or more computing resource services to not present the one or more honeypot resources to the set of entities.

8. The system of claim 5, wherein:
the request specifies a set of entities that are to be considered trusted entities; and
the instructions further cause the system to:
generate a first configuration and a second configuration, wherein:
the first configuration causes the system to provide the configuration information to the one or more computing resource services to cause the one or more computing resource services to present the one or more honeypot resources; and
the second configuration causes the system to provide second configuration information to the one or more computing resource services to cause the one or more computing resource services to omit auditing information indicating user access to the one or more honeypot resources by the set of entities; and
apply the second configuration in response to the request.

9. The system of claim 5, wherein the configuration information further causes the one or more computing resource services to generate, as a result of detection of the first user accessing the one or more honeypot resources, a notification indicating that the first user has accessed the one or more honeypot resources.

10. The system of claim 9, wherein the configuration further causes the one or more computing resource services to transmit the notification to one or more notifications services that, as a result of receiving the notification, provide the notification to one or more recipients subscribed to the one or more notifications services.

11. The system of claim 5, wherein the configuration information further causes the one or more computing resource services to evaluate metadata associated with the one or more honeypot resources obtained as a result of access by the first user to the one or more honeypot resources to determine that the first user has accessed the one or more honeypot resources.

12. The system of claim 5, wherein the configuration information further causes the one or more computing resource services to configure the one or more honeypot resources based at least in part on one or more attributes of the non-honeypot resources presented by the one or more computing resource services.

13. A non-transitory computer-readable storage medium having stored thereon executable instructions that, as a result of being executed by one or more processors of a computer system, cause the computer system to at least:
    generate, as a result of receiving a request to provision a honeypot resource, one or more policies applicable to a first user utilizing a computing resource service that cause the computing resource service to monitor interaction by the first user with the honeypot resource;
    transmit the one or more policies to a policy database;
    generate configuration information that, as a result of being utilized by the computing resource service, causes the computing resource service to obtain the one or more policies from the policy database; and
    transmit the configuration information to the computing resource service to cause the computing resource service to:
        present the honeypot resource to the first user in accordance with the one or more policies; and
        present non-honeypot resources to a second user as a result of the one or more policies being inapplicable to the second user.

14. The non-transitory computer-readable storage medium of claim 13, wherein:
    the request to provision the honeypot resource specifies one or more actors that are to be deemed trusted actors; and
    the one or more policies further cause the computing resource service to present non-honeypot resources to the one or more actors without presenting the honeypot resource.

15. The non-transitory computer-readable storage medium of claim 13, wherein:
    the request to provision the honeypot resource specifies one or more actors that are to be deemed trusted actors; and
    the one or more policies further prevent the computing resource service from monitoring user interaction with the honeypot resource by the one or more actors.

16. The non-transitory computer-readable storage medium of claim 13, wherein the configuration information further causes the computing resource service to record any interaction by the first user with the honeypot resource in a notification as a result of detecting the interaction by the first user with the honeypot resource.

17. The non-transitory computer-readable storage medium of claim 16, wherein the configuration information further causes the computing resource service to transmit the notification to one or more notification services to cause the one or more notification services to provide the notification to one or more entities.

18. The non-transitory computer-readable storage medium of claim 13, wherein the one or more policies further cause the computing resource service to evaluate metadata associated with the honeypot resource in response to interaction by the first user with the honeypot resource to detect the interaction by the first user with the honeypot resource.

19. The non-transitory computer-readable storage medium of claim 13, wherein the honeypot resource is presented such that the honeypot resource has one or more attributes of non-honeypot resources provided by the computing resource service.

20. The non-transitory computer-readable storage medium of claim 13, wherein the one or more policies cause the computing resource service to present non-honeypot resources in conjunction with the honeypot resource to enable the first user to access the non-honeypot resources and the honeypot resource.

* * * * *